Dec. 25, 1951     D. GONDA     2,580,223
APPARATUS FOR EXTRACTING MANDRELS
FROM CAVITIED PLASTIC STRUCTURES
Filed July 10, 1948     4 Sheets-Sheet 1
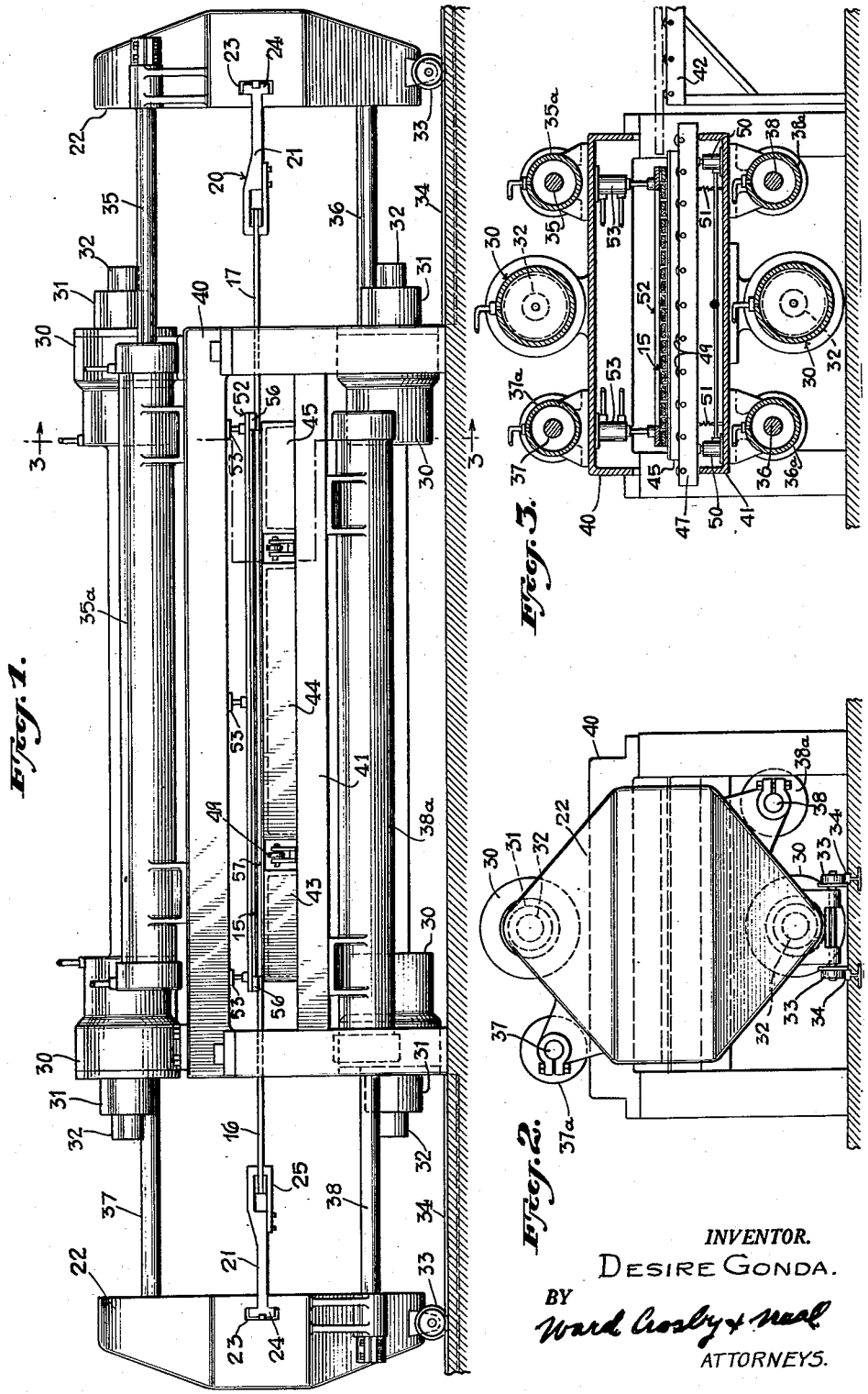
INVENTOR.
DESIRE GONDA.
BY Ward Crosby & Neal
ATTORNEYS.

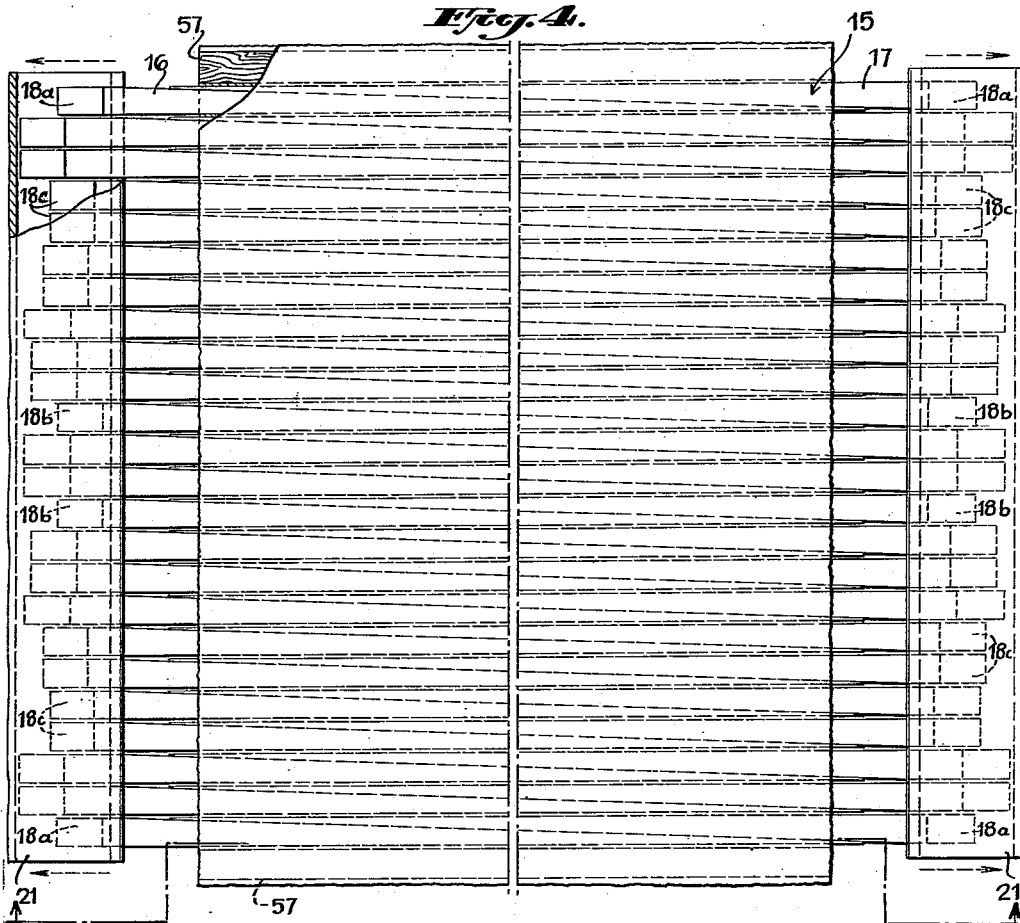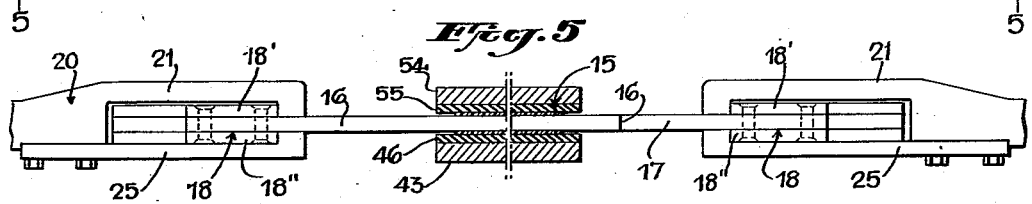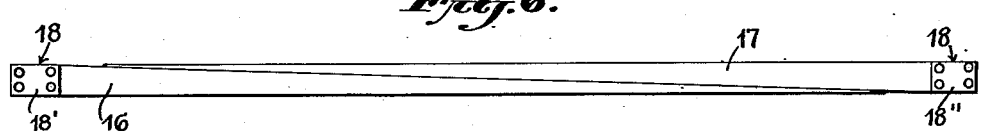
INVENTOR.
DESIRE GONDA
ATTORNEYS.

INVENTOR.
DESIRE GONDA.
ATTORNEYS.

Dec. 25, 1951 D. GONDA 2,580,223
APPARATUS FOR EXTRACTING MANDRELS
FROM CAVITIED PLASTIC STRUCTURES
Filed July 10, 1948 4 Sheets-Sheet 4
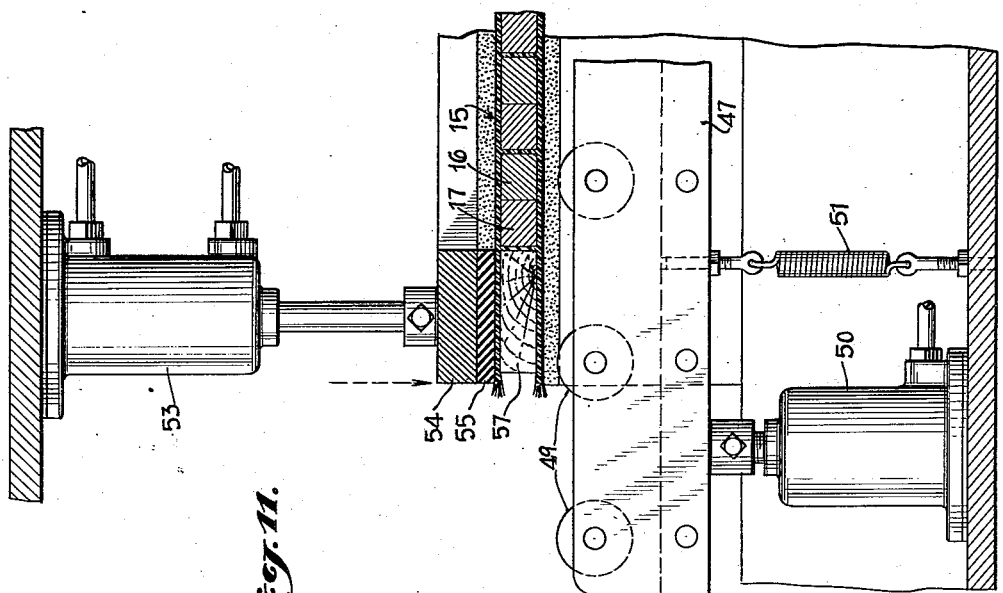
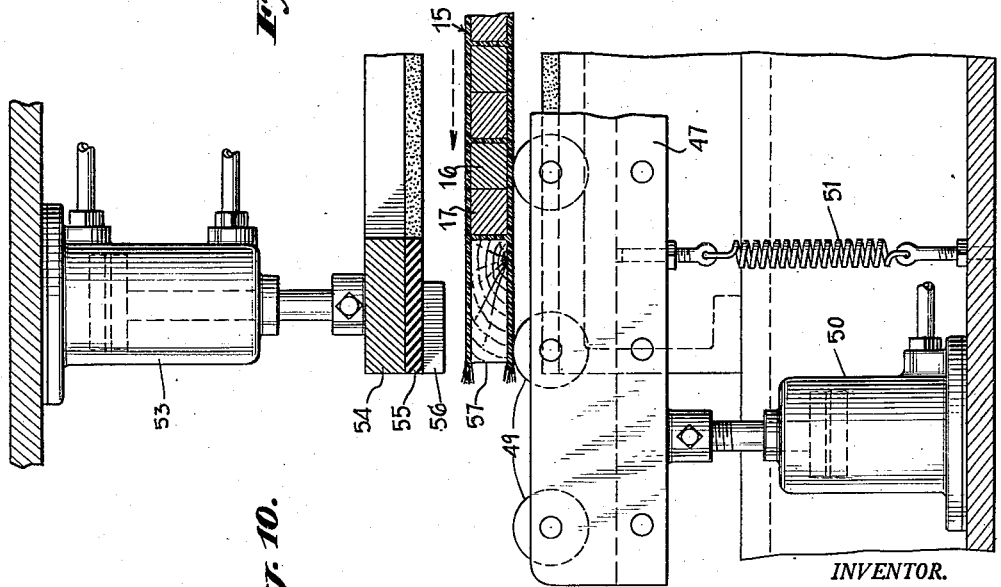
INVENTOR.
DESIRE GONDA.
BY
Ward, Crosby & Neal
ATTORNEYS.

Patented Dec. 25, 1951

2,580,223

UNITED STATES PATENT OFFICE 2,580,223

APPARATUS FOR EXTRACTING MANDRELS FROM CAVITIED PLASTIC STRUCTURES

Desire Gonda, Sittingbourne, England, assignor to Holopast Limited, Kent, England, a British company Application July 10, 1948, Serial No. 38,038

2 Claims. (Cl. 154—1)

This invention relates to methods and apparatus for removing mandrels and the like from the cavities of plastic structures, such for example as from thermo-set laminated plastic structural units which have been formed under heat and pressure with such mandrels in place therein for supporting the cavity walls during the pressing operation.

The invention will be disclosed as used in the manufacture of integral laminated thermo-set plastic structural units of the type, for example, disclosed in my co-pending application Serial No. 579,429, filed February 23, 1945 (now Patent No. 2,445,290, granted July 13, 1948) which application was a division of my application Serial No. 424,090, filed December 22, 1941, now abandoned. Such structural units have spaced-apart panel-like portions which are interconnected by spaced webs with generally parallel channel-like open-ended cavities defined by said portions and webs. According to the example of the invention here disclosed, the manufacture of such structural units involves subjecting the plastic assembly to elevated temperature for thermo-setting the plastic material while applying high pressure thereto in directions tending to reduce the cross-sectional dimensions of the cavities, but each cavity being meanwhile filled with two or more complementary longitudinal tapered mandrels designed and arranged so that their larger ends are adapted to be gripped for withdrawal at opposite ends of the cavity after the completion of the temperature and pressure treatment.

The curing of such structural units at elevated temperature is preferably carried out under pressure in the neighborhood of 1500 lbs. per square inch, and accordingly if the cavities are of substantial size or length, the mandrels will be so securely gripped therein, that the problem of dislodging and extracting same presents serious difficulties which, so far as I am aware, have not been solved prior to my invention hereof, and have no comparable counterpart in the plastics industry or other arts. For example, if a pair of tapered mandrels are to be removed from such a cavity which is about 8' long and having a cross-section, for example, of ¾" by about 2", it will be found that a force in the neighborhood of 100 tons or more may have to be applied to start the extracting movement of each individual mandrel. The laminated structural unit as formed in the press will ordinarily have rough feathered edges of the laminae around adjacent the protruding mandrel ends, so that no secure stop means can be applied around adjacent the mouth of the cavity to hold the unit securely against movement while a force of such magnitude is applied to extract the mandrel. Furthermore, if any attempt is made to clamp the structural unit with sufficient pressure against its wall surfaces to hold it in place during the application of any extracting force of such magnitude to the mandrel, then the clamping pressure will only cause the mandrel to be all the more securely clamped in the cavity, inasmuch as the cavity walls will be sufficiently flexible to yield against any such heavy pressure as would be required in proceeding in that way.

According to the presnet invention the above explained difficulties are overcome by a method which involves as one of its features the simultaneous application of powerful and substantially equal and oppositely directed extracting forces to the grip portions of mandrels at opposite cavity ends respectively, and by such forces withdrawing an equal number of mandrels in each direction simultaneously. By proceeding in this way, it is unnecessary to apply any firm stop means against the structural unit to prevent its movement during the extraction process, and neither is it necessary to apply any substantial pressure to the unit to prevent its movement, although a small amount of clamping pressure may be initially applied to prevent any undesired movement which might otherwise result from the slight differences between the two oppositely directed extraction forces, or the differences in friction against the oppositely extracted mandrels respectively.

Various further and more specific features, objects and advantages of the invention will clearly appear from the detailed description given below, taken in connection with the accompanying drawings which form a part of this specification and illustrate by way of example a preferred embodiment of apparatus for carrying out the invention.

In the drawings:

Figure 1 is a side elevational view of one form of hydraulic extraction apparatus which may be used in practicing the invention;

Fig. 2 is a view showing one of the ends of the apparatus of Fig. 1;

Fig. 3 is a sectional view taken substantially along line 3—3 of Fig. 1;

Fig. 4 illustrates in plan view a cavitied laminated structural unit with mandrels in the cavities thereof and showing the appearance of the assembly as it comes from the pressing operation and also showing the manner in which the mandrels are gripped for extraction;

Fig. 5 is an edge view partly in section (along the line 5—5 of Fig. 4) of the assembly of Fig. 4;

Fig. 6 is a plan view showing a pair of complementary tapered mandrels in the relationship which they bear to each other when within a cavity of the structural unit of Fig. 4;

Figs. 10 and 11 are vertical sectional views partly broken away, showing the portion of the apparatus of Fig. 7 prior to and after clamping therein one of the structural unit assemblies.

Figure 7:
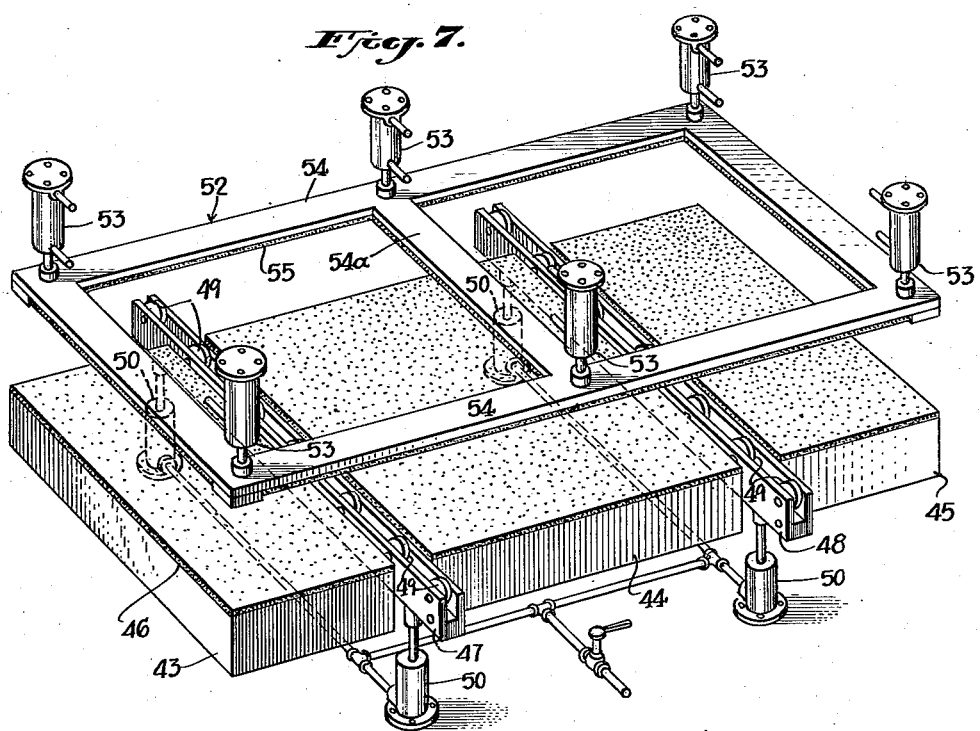
Fig. 7 is a detailed perspective view showing one simple form of apparatus for supporting and holding the structural unit during the mandrel extraction operation by the apparatus of Fig. 1.
Figure 8:
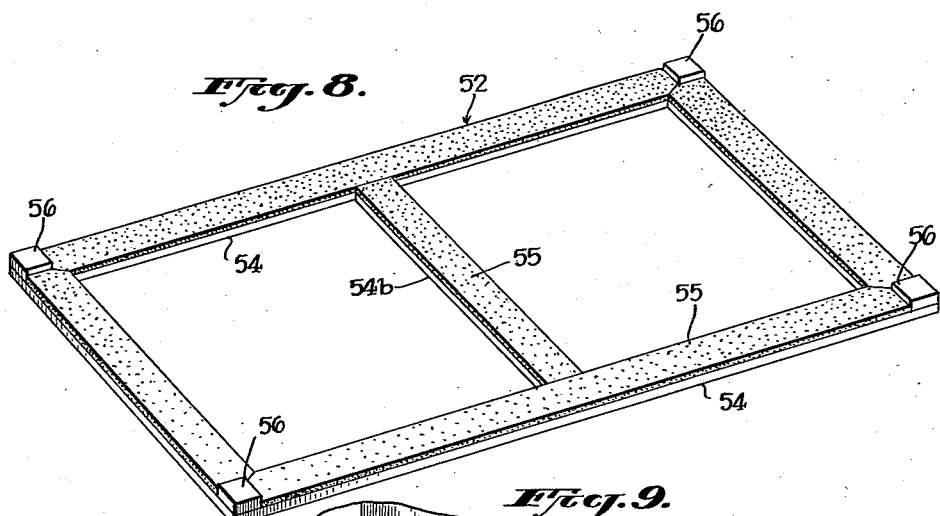
Fig. 8 is a bottom-side-up perspective view of the clamping frame shown in Fig. 7.
Figure 9:
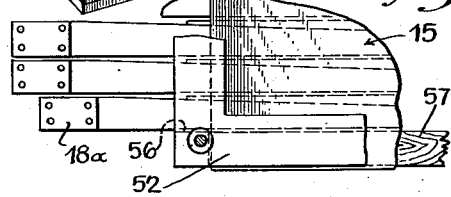
Fig. 9 is a fragmentary corner view showing such clamping frame as applied to the structural unit and mandrel assembly.

Referring to the drawings in further detail, and more particularly to Fig. 4, one of the structural cavitied laminated plastic units such as disclosed in my above-mentioned co-pending application is shown at 15 with a pair of longitudinally tapered mandrels as at 16, 17 filling each cavity. These mandrels are preferably so shaped as shown in Fig. 6 that the abutting side surfaces thereof respectively will be gradually tapered from one end to the other. Two or more of such complementary tapered mandrels may be used conjointly having a cross-section of dimensions such as to completely fill one of the cavities in the structural unit. The larger end of each mandrel preferably is such as to protrude outside the end of the mouth of the cavity to form a grip portion as shown at 18 in Figs. 5 and 6, although it will be appreciated that various other forms of grip portions might be provided. As shown, these grip portions may comprise metal plates as at 18', 18", riveted, as indicated in Fig. 5, to the upper and lower surfaces of the end of the mandrel.

As indicated in Figs. 4 and 5, the mandrel grip portions may be gripped in jaw structures 20, comprising a rigid upper jaw portion 21, one of these jaw portions being provided on each end of the extracting apparatus as shown in Fig. 1, the portions 21 extending into the large heavy head blocks 22. These blocks are formed with cavities as at 23 within which head portions 24 on the members 21 may be slid into place sideways, connecting the jaws to the head blocks 22. On its lower side, each of the jaw members 21 has bolted thereto a lower complementary jaw portion 25. As indicated in Fig. 4, the jaws are wide enough so that the assembly of the mandrels in the structural unit may be slid in sideways of the jaws, as shown in Fig. 4, into a position such that the jaws embrace all of the mandrel grip portions at one time.

However, as further shown in Fig. 4, the mandrels are so positioned or are made of such length, that they do not all extend to equal distances from the cavity ends. That is, for example, the grip portions 18a on the mandrels which are located in the two cavities at the edges of the unit 15, are preferably positioned closer to the unit 15 than are the grip portions on the other mandrels, so that as the jaws are moved apart in opposite directions (as indicated by the arrows on Fig. 4), the mandrels in these two outer cavities will be gripped first, and the extraction thereof started before the jaws start to extract other mandrels. In other words, with the arrangement of the grip portions of the mandrel as shown, the initial movement of the jaws 20 will start the extraction of all four of the mandrels in the outer two cavities simultaneously. Thus the extracting forces at the opposite ends of these two cavities may be evenly balanced with respect to the mid portion of the structural unit, and two equal and opposite forces at opposite cavity ends on the mandrels, will counteract each other without causing any such force to be applied to the structural unit as might tend to move it sideways or to turn it to any angle to the position shown in Fig. 4. As further shown in Fig. 4, very shortly after the mandrel grip portions 18a have been engaged by the jaws 20 (or even practically concurrently therewith, if desired) the four mandrel grip portions 18b will be engaged by the jaws to start the extraction of four more of the mandrels which are also symmetrically positioned with respect to the middle portion of the structural unit. Next grip portions 18c of eight other mandrels will be engaged and the extraction of such mandrels will be started. Similarly it will be apparent that the starting of the extraction of the remaining groups of the mandrels may be accomplished in succession, the mandrels of each group which are started concurrently preferably being symmetrically arranged with respect to the center of the structural unit to avoid any non-symmetrical or turning forces on the unit which might cause cracking or greater friction against extraction of the mandrels. It will be apparent that the starting of the extraction of the mandrels successively in groups makes it possible to use an extracting force which is much less powerful than would be the case if all of the mandrels were dislodged concurrently. The starting of the extraction of eight of the mandrels concurrently (four in each direction) as in the case of the mandrels 18c above-mentioned, requires for a structural unit of the above stated dimensions, powerful equal and opposite forces in the neighborhood of 500 tons. Thus the starting of the extraction of the mandrels in groups successively avoids the necessity of apparatus of practically prohibitive dimensions, cost and power, which would otherwise be necessary.

Referring now more particularly to Fig. 1, the hydraulic apparatus there shown may comprise for example four powerful hydraulic cylinders of suitable known construction as at 30, having plungers as at 31 positioned to initially protrude and push against the head blocks 22 for starting the movement thereof to effect the initial extraction movement of the mandrels. These plungers and accompanying cylinders may be so designed as to apply the above-mentioned initial force of 500 tons against the head blocks respectively in opposite direction and with a stroke of 2" for example, which is sufficient to start the extraction of all of the mandrels. These plungers may surround smaller plungers as at 32 which start to protrude and push against the head blocks 22 after completion of the stroke of the plungers 31. These latter plungers may be designed in conjunction with cylinder structure 30 to operate with a stroke of 6", for example, and thereby to apply equal and opposite forces in the neighborhood of 250 tons further to extract the mandrels. The specific manner in which the cylinders 30 and the concentric plungers therein may be constructed and designed to operate as above explained, is well known in hydraulic apparatus and accordingly need not be here described in further detail.

It will be noted that the hydraulic cylinders 30 and the plungers therein are positioned symmetrically above and below with respect to the mandrel assemblies to be extracted so that the head blocks 22 will be thrust outwardly directly along lines parallel to the mandrels and the cavities from which they are to be extracted, thus avoiding any possibility of turning or twisting the mandrels which would result in injury to the structural unit or increase the frictional resistance against the mandrels. Each of the head blocks, as shown in Figs. 1 and 2, may be supported on wheels or trucks as at 33 running on tracks 34.

Upon completion of the 6-inch strokes of the plungers 32, further extraction of the mandrels is effected by the action of long-stroke plungers 35—38 inclusive, these plungers at the outer ends being rigidly affixed to the head blocks 22 and serving to hold the latter in upright position as they are shoved along the tracks 34. The inner ends of the plungers 35—38 are received in hydraulic cylinders 35a—38a, inclusive, designed to impart to the plungers a stroke for example of about 9 feet, and to provide equal and opposite forces each totaling from 20 to 40 tons. It will be noted, as best indicated in Fig. 3, that the plungers 35 and 36 are positioned respectively at equal distances above and below the mandrel assembly to be extracted and at equal distances to each side of the hydraulic cylinders 30 for thrusting out the head block 22 at the right hand end of Fig. 1. The plungers 37 and 38 are positioned similarly to operate the head block 22 at the left hand end of Fig. 1.

As indicated in Fig. 3, the upper and lower hydraulic cylinders may be mounted upon upper and lower rigid frame structures 40, 41 between which the assembly of apparatus of Fig. 7 is mounted for receiving the structural unit and mandrel assembly to be acted upon, such assembly being slidable into place from the right side of the apparatus as viewed in Fig. 3, suitable table means with rollers for this purpose being indicated at 42. The structure as shown in Fig. 7 comprises three table portions as at 43, 44, 45, surfaced, for example, with hard rubber as at 46, these table portions being suitably mounted in stationary position upon the frame structure 41. Slotted bar structures as at 47, 48 are positioned along within the gaps between the table areas 43—45, these bars serving to carry rollers as at 49, upon which the assembly 15 may be rolled into place as shown in Fig. 10. The slotted bars 47, 48 are supported at their ends by hydraulic cylinder and plunger devices as at 50, so that after the assembly 15 is in the position shown in Fig. 10, the slotted bars and rollers may be lowered by actuation of the hydraulic devices to the position indicated in Fig. 11, where the rollers 49 are shown depressed out of contact with the assembly 15, so that the latter will now rest upon the hard rubber surfaced table portions 43—45. Spring means as at 51 may be provided to insure that the roller assemblies will be pulled down into depressed position upon release of the pressure in the hydraulic devices 50.

A frame structure 52 is suspended above the table portions 43—45 by a plurality of hydraulic cylinder and plunger devices as indicated at 53. This frame structure may comprise a metal part 54 shaped to conform substantially to the perimeter of the assembly 15 to be acted upon and having, if desired, a central cross piece 54a. The under side of this frame may be surfaced with hard rubber as at 55 for engaging the assembly 15 when the hydraulic devices 53 are actuated to lower the frame. Metal corner blocks as at 56 are provided on the under surface of the frame in positions to engage, when the frame is lowered, the end edges of the assembly 15, thereby to offer some resistance against endwise displacement of such assembly. It will be understood that when the assembly 15 is slid into place, the hydraulically operated head blocks 22 will be in retracted position so that the mandrel assemblies may be slid sidewise into the clamps 20, whereupon after the assembly 15 is in place, as indicated in Fig. 10, the hydraulic devices 50 and 53 are actuated to support the assembly in the position shown in Fig. 11 and retain it in such position with a certain degree of firmness.

As shown in Figs. 4, 10 and 11, the two outerside edge cavities of the assembly 15 may be filled with strips of wood as at 57, which do not have to be extracted if it is desired to use such wood in nailing or otherwise securing the structural unit in place during use. If it is desired to have these outer edge cavities open in the finished unit, they may be filled by metal members, the removal of which presents no problem since the sides of these cavities are open. In either event, as will be apparent from Figs. 7, 10 and 11, the frame 52 is so constructed and the hydraulic devices 53 are so positioned that the pressure applied in holding the assembly 15 in position is largely against the side edges of the assembly 15 where the inserts 57 occur. Thus the application of pressure against the parts of the assembly where the mandrels occur, is substantially avoided, so that any added resistance against extraction of the mandrels is obviated.

After the actuation of the plungers 31, 32, 35—38 to extract the mandrels, it will be apparent that the hydraulic devices 53 may be actuated to elevate the frame 52, whereupon the hydraulic devices 50 may be actuated to elevate the rollers 49 and the assembly 15 may then be rolled out of the apparatus.

While the invention has been described in detail with respect to a particular preferred example, it will be understood by those skilled in the art after understanding the invention, that various changes and modifications may be made without departing from the spirit and scope of the invention, and it is intended therefore in the appended claims to cover such changes and modifications.

What is claimed and desired to be secured by Letters Patent is:

1. In apparatus for extracting mandrels from the opposite ends respectively of a plurality of parallel cavities in a plastic structural unit which has been treated under pressure with the mandrels therein, the combination comprising means for supporting and retaining the structural unit in generally horizontal position, power operated clamping means for applying pressure along the two side edges of the structural unit to press same against said supporting means to restrain movement of the unit, jaw means for engaging said mandrels at opposite ends of the structural unit, means constructed and arranged to support said jaw means respectively for linear movement in opposite directions from said cavity ends, and fluid pressure operated plunger and cylinder means both above and below said frame means and constructed and arranged simultaneously to thrust said jaw means in said opposite directions with substantially equal forces.

2. In apparatus for extracting mandrels from the opposite ends respectively of a plurality of substantially parallel cavities in a thermo-set plastic structural unit which has been treated under heat and pressure with the mandrels therein, the combination comprising table-like means for supporting and retaining the structural unit in generally horizontal position, a retaining frame shaped perimetrically to engage the upper surface of the panel, said frame including at its corners parts adapted to engage, when the frame is lowered into contact with the panel, the end edges of such panel adjacent the corners thereof to restrain same against endwise movement, power operated means for effecting the raising and lowering of said frame, jaw means for engaging such mandrels at opposite ends of the structural unit, means constructed and arranged to support said jaw means respectively for linear movement in opposite directions from said cavity ends, and fluid pressure operated plunger and cylinder means constructed and arranged simultaneously to thrust said jaw means in said opposite directions.

DESIRE GONDA.

REFERENCES CITED

The following references are of record in the file of this patent:

UNITED STATES PATENTS

| Number | Name | Date |
|---|---|---|
| 1,394,558 | Klug | Oct. 25, 1921 |
| 1,673,603 | Stoney | June 12, 1928 |
| 2,029,048 | Atwood | Jan. 28, 1936 |
| 2,366,976 | Martindell | Jan. 9, 1945 |
| 2,433,546 | Cornelius | Dec. 30, 1947 |
| 2,445,290 | Gonda | July 13, 1948 |